Patented Aug. 18, 1936

2,051,120

UNITED STATES PATENT OFFICE 2,051,120

VIOLANTHRONE DERIVATIVES

Alexander John Wuertz and William Hiram Lycan, South Milwaukee, Wis., assignors to E. I. du Pont de Nemours & Company, Wilmington, Del., a corporation of Delaware No Drawing. Application June 1, 1933, Serial No. 673,878. Renewed May 16, 1936

11 Claims. (Cl. 260—61)

This invention relates to carbon compounds and more particularly to the preparation of derivatives of violanthrones. It especially appertains to the substances produced by the treatment of violanthrones with di-halides.

It is well known by those skilled in the art that compounds known as benzanthrones are produced when compounds of the anthraquinone series are condensed with glycerine (see United States of America Patents 818,992 of April 24, 1906 and 809,892 of January 9, 1906 to Bally and Isler and 786,085 of March 28, 1905 to Bally). When benzanthrones are fused with caustic alkali under appropriate conditions there are produced compounds known as violanthrones (see Color Index 1099).

Compounds having the violanthrone structure are powerful vat dyes. Since their discovery a tremendous amount of research work has been expended upon them. This work has developed the fact that two positions of such a nucleus are more reactive than the others. It is the general belief that the Bz-2, Bz-2' positions are the ones showing this particular activity.

It has now been found that new chemical compounds, new vat dyes, new colored carbon compounds, new intermediates and new vattable compositions of matter may be produced by reacting (or condensing) di-halides especially omega-di-halogen-methyl compounds with violanthrones having these active positions free (or unoccupied).

This invention had for an object the preparation of new chemical compounds. Other objects were the preparation of carbon compounds in a very desirable physical form and in a high state of purity. Still further objects were to produce new vat dyes, new derivatives of violanthrones and to device new chemical processes. A general advance in the art and other objects which will appear hereinafter are also contemplated.

These objects are accomplished by treating violanthrones, not substituted in the Bz-2, Bz-2' positions, with omega-di-halogen-methyl compounds in the presence of aluminum chloride until one molecular proportion of the omega-di-halo body, or compound, has been condensed, or reacted, with one molecular proportion of the violanthrone.

The invention will be further understood from a consideration of the following detailed description and specific examples in which the parts are given by weight.

*Example I*

In a suitable receptacle, there was placed 500–600 parts of antimony trichloride and the same heated to 180° C. To this melt was added 250–300 parts of anhydrous aluminum chloride under agitation. During the addition the temperature dropped to 100–120° C. It was raised to 150°–155° C. in order to permit the aluminum chloride to digest completely. When a clear solution was obtained the temperature was lowered to 100°–120° C. and 100 parts of finely powdered violanthrone were introduced over a period of one-half to one hour. Complete digestion was permitted to take place. This took place in approximately thirty minutes at 110°–120° C. When this was accomplished, 40–50 parts of ortho-chloro-benzal chloride were introduced into the melt at 90–100° C. at such a rate as not to allow the temperature to rise over 100°–105° C. When the addition was complete the temperature was cautiously raised to 140°–160° C. for a period of 2–4 hours. The product was isolated in like manner. The smooth melt was then drowned in a cold solution of hydrochloric acid containing 5–10% HCl, heated to 50°–90° C. and subsequently filtered. The residue was washed with 2–5% hot hydrochloric acid and then with hot water until free of acid. The reaction apparently proceeds in such a manner as to allow the chlorine atom in the phenyl nucleus to remain intact. This fact may be substantiated by an elementary analysis of the end product. The residual product which was a dark blue paste assumed, when dry, the physical appearance of a violet powder. Its sulphuric acid solution was reddish-blue to blue.

The new product dyes from a blue to reddish-blue alkaline hydrosulfite vat in pure blue shades which, when oxidized by exposure to air, change to bright blue shades. Its alkaline hydrosulfite vat is characterized by a remarkable red fluorescence. When dyed on cotton this new product produces shades which are extremely fast to chlorine, washing and sunlight. It may be used for printing purposes when prepared in paste form.

Processes similar to that set out above were carried out replacing the ortho-chloro-benzal chloride with benzal chloride, para-bromo-benzal chloride, meta-nitro-benzal chloride, alpha and beta (di-chloro-methyl) naphthalenes and chloro- and nitro- substituted alpha and beta (di-chloro-methyl) naphthalenes. New and valuable compounds and dyes ranging in tints from green-blue to reddish-blue and having exceptional fastness to bleach and washing and other properties generally similar to the product of the process specifically described, were produced.

Example II

To a melt of essentially the same proportions of antimony trichloride and aluminum chloride as specified in Example I, there was added 100 parts of violanthrone at 110°–120° C. under good agitation. When complete digestion of the violanthrone had taken place, 67–83 parts of 1-chloro-2-omega-di-chloro-methyl-anthraquinone were introduced into the smooth melt. When this was completed the temperature was raised by heating to 160°–200° C. and maintained within this range for a period of 2–3 hours or until a test sample showed no further evidence of a color change in sulphuric acid. The color change developed in this instance was a brilliant blue differing from the reddish-violet color of violanthrone.

The end product was isolated in a manner similar to that described in Example I. Analysis indicates that the alpha chlor atom remained in its position throughout the reaction. The product thus obtained dyes cotton in pure blue shades from an alkaline hydrosulfite vat. These dyeings exhibited remarkable fastness properties when exposed to light, acids, alkalies, scrubbing and bleaching.

In like manner, condensations of violanthrones with 1 - chloro - 6 - omega-di-chloro-methyl-anthraquinone, 1-nitro-6-omega-di-chloro-methyl-anthraquinone, 1 - amino - 2 - omega-di-chloro-methyl-anthraquinone and 1-amino-6-omega-di-chloro-methyl-anthraquinone were also carried out. There were obtained compounds and dyes which exhibited properties similar to those of the preceding example and which dyed cotton in hues ranging from reddish-blue to greenish-blue.

The catholicity of the invention is apparent from the preceding description and specific examples. In addition to the carbocyclic omega-di-halogen-methyl compounds, examples of which have been set out above, compounds having acyclic and heterocyclic nuclei attached to the di-halide radical are also especially suitable for the reactions utilized in this invention. If desired, compounds whose nuclei involve a plurality of such types of structure may be satisfactorily used. Aromatic compounds, such as those of the benzene, naphthalene, anthracene and phenanthrene series, are deserving of special mention. The condensed ring compounds of the naphthalene and anthraquinone series are especially desirable. The di-chloro-methyl compounds of the benzene and naphthalene series are quite advantageously used.

The amount of antimony trichloride or other metal halide used as an adjuvant in the aluminum chloride melt may be varied over a wide range. If desired the antimony chloride may be omitted entirely. The addition of other metal chlorides, such as sodium and zinc chloride to the melt for the purpose of producing proper fluidity, melting point or other physical and/or chemical conditions may be made if found expedient.

The temperature limits set forth in the foregoing examples are capable of wide variation without harmful change in results. Ordinarily, the temperature range of 90°–180° C. for the condensation is preferred. Temperatures outside this range may be used at the sacrifice of time and/or yield of product. The temperatures for producing homogeneity in the melt and for drowning the fusion are not especially significant and depend upon the convenience of the person carrying out the reaction.

Time limits are likewise elastic and no detriment to the product has been noted after prolonged heating in the reaction melt.

The proportions of the reactants may be widely varied without apparently affecting the results. An excess of either reactant remains in the melt when the reaction is complete and may be removed from the final product by suitable means. The reactant present in the least molecular proportion is quantitatively consumed during the reaction. Any excess of violanthrone may be separated from the condensation product by virtue of a diverse solubility in such solvents as concentrated sulphuric acid, organic solvents and alkaline hydrosulfite solutions. Any excess of the other reactants may be removed by suitable expedients for example, extraction with organic solvents or aqueous alkaline solutions.

The exact change taking place in the violanthrone molecule during the treatment with the alkali di-halide (that is, omega-di-halogen-methyl compounds, the generic term for such compounds as the alkylidine di-halides, aralkylidine di-halides, aldehyde di-halides, benzal-chloride homologs and analogs, omega-di-halogen-methyl-anthraquinone, and the like), is not known. It is believed that a condensation product in which the violanthrone nucleus is linked through its Bz-2 position to the di-halide body with which it was reacted is produced. However, it is not desired to limit the invention to any particular theory and the above explanation is given only for the purpose of aiding in understanding the invention.

This invention, or discovery, has numerous advantages as will be apparent to those skilled in the art. As outstanding among these, there may be mentioned the production of a new series of vat dyes and vattable products. New and important colored compounds, coloring matters and intermediates are now made available for the art.

As many apparently widely different embodiments of this invention may be made without departing from the spirit and scope thereof, it is to be understood that we do not limit ourselves to the specific embodiments thereof except as defined by the appended claims.

We claim:

1. The process which comprises condensing, in the presence of aluminum chloride and within the temperature range 90°–180° C. an omega-di-halogen-methyl compound with a violanthrone whose Bz-2, Bz-2' positions are unoccupied.

2. The process of claim 1 when the treatment is carried out in the presence of a mixture of aluminum chloride and antimony chloride.

3. The product obtainable by condensing, in the presence of aluminum chloride and within the temperature range 90°–180° C. an omega-di-halogen-methyl compound with a violanthrone whose Bz2-Bz2' positions are unoccupied.

4. The process which comprises condensing an omega-di-halogen-methyl compound with a violanthrone whose Bz2-Bz2' positions are unoccupied, the condensation being carried out in the presence of aluminum chloride.

5. The product obtainable by condensing an omega-di-halogen-methyl compound with a violanthrone whose Bz2-Bz2' positions are unoccupied, said condensation being carried out in the presence of aluminum chloride.

6. The process which comprises condensing benzal chloride with a violanthrone whose Bz2-Bz2' positions are unoccupied, the condensation being carried out in the presence of aluminum chloride.

7. The process which comprises condensing ortho-chloro-benzal chloride with a violanthrone whose Bz2-Bz2' positions are unoccupied, the condensation being carried out in the presence of aluminum chloride.

8. The process which comprises condensing 1 - chloro - 2 - omega - di - chloro - methyl - anthraquinone with a violanthrone whose Bz2-Bz2' positions are unoccupied, the condensation being carried out in the presence of aluminum chloride.

9. The product obtainable by condensing benzal chloride with a violanthrone whose Bz2-Bz2' positions are unoccupied, said condensation being carried out in the presence of aluminum chloride.

10. The product obtainable by raising the temperature of 500–600 parts of antimony trichloride to 280° C., adding 250–300 parts of anhydrous aluminum chloride under agitation, adjusting the temperature to 150°–155° C., maintaining this temperature until the aluminum chloride digests to a clear solution, adjusting the temperature to 100°–120° C., adding 100 parts of violanthrone over a period of one-half to one hour, maintaining a temperature of 110°–120° C. until digestion is complete, adjusting the temperature to 90°–100° C., adding 40–50 parts of ortho-chloro-benzal chloride while maintaining the temperature below 100°–105° C., raising the temperature to 140°–160° C. for a period of 2–4 hours, drowning the melt in a cold 5–10% solution of hydrochloric acid, heating to 50°–90° C., filtering, washing with 2–5% hydrochloric acid and freeing the resultant from acid by washing with hot water, which product is a violet powder giving a reddish-blue to blue sulphuric acid solution.

11. The product obtainable by raising the temperature of 500–600 parts of antimony trichloride to 280° C., adding 250–300 parts of anhydrous aluminum chloride under agitation, adjusting the temperature to 150°–155° C., maintaining this temperature until the aluminum chloride digests to a clear solution, adjusting the temperature to 100°–120° C., adding 100 parts of violanthrone over a period of one-half to one hour, maintaining a temperature of 110°–120° C. until digestion is complete, adjusting the temperature to 90°–100° C., adding 67–83 parts of 1-chloro-2-omega-dichloro-methyl-anthraquinone while maintaining the temperature below 100°–105° C., raising the temperature to 160°–200° C. for a period of 2–3 hours, drowning the melt in a cold 5–10% solution of hydrochloric acid, heating to 50°–90° C., filtering, washing with 2–5% hydrochloric acid and freeing the resultant from acid by washing with hot water, which product gives a brilliant blue color in sulphuric acid.

ALEXANDER JOHN WUERTZ.
WILLIAM HIRAM LYCAN.